INVENTOR.
FRANK N. GILLETTE
GEORGE W. KING
BY
*H. S. Mackey*
ATTORNEY.

June 28, 1955  F. N. GILLETTE ET AL  2,712,064
TEST PATTERN GENERATOR
Filed Jan. 6, 1951  2 Sheets-Sheet 2

INVENTOR.
FRANK N. GILLETTE
GEORGE W. KING
BY
ATTORNEY

United States Patent Office 2,712,064
Patented June 28, 1955

2,712,064

TEST PATTERN GENERATOR

Frank N. Gillette and George W. King, Pleasantville, N. Y., assignors to General Precision Laboratory Incorporated, a corporation of New York Application January 6, 1951, Serial No. 204,796

13 Claims. (Cl. 250—27)

This invention pertains to a test pattern generator particularly adapted for testing television equipment. More particularly the invention contemplates the provision of a step generator for generating a repeated series of regular steps of voltage which may be translated into a suitable pattern of light and dark areas by the equipment under test, the regularity of translation and the graduation of shades of the pattern indicating proper or improper operation of the equipment under test.

By step voltage is meant a voltage that changes abruptly, then remains constant for a period of time and the present invention contemplates the generation of a repeated series of such steps consisting of a voltage which abruptly increases by a small amount, remains constant for a short time, again abruptly increases and remains constant, repeating several times to form a series of abrupt increases separated by time intervals. The voltage then drops to its original value and the entire series is repeated.

The invention is particularly useful in testing television equipment, particularly in testing video amplifiers for fidelity of response and in overall tests of televison recording equipment. In either case the output of the device is employed as a standard test signal at the input of the equipment to be tested, and any of the various types of distortions visible in the output indicate what aberrations have been introduced by the equipment.

In testing a video amplifier one may have for an object the determination of the linearity of response as respects variation of input amplitude. This objective is easily accomplished by applying the step generator voltage to the input of the amplifier and observing the amplifier output voltage wave form on a picture tube. Amplitude nonlinearity causes vertical compression or stretching of some parts of the picture tube pattern in comparison with the other parts. Furthermore, imperfect low-frequency fidelity causes bending of the straight bottom outline of the test wave form.

The utility of the instant invention far surpasses laborious point-by-point measurement of the amplitude and frequency characteristics of video-type apparatus, and is not only easier to use but it far superior in accuracy of result because, in measuring a characteristic by the point-by-point method, it is nearly impossible to keep all conditions constant for the length of time necessary to plot the entire curve, so that the results fluctuate due to the inconstancy of the conditions. On the other hand, when employing the step generator the entire output is seen at once as a pattern, all amplitude and frequency characteristics being visible in each 1/60 second frame and consequently all being perceived simultaneously by the eye. Consequently, test results obtained by the use of the invention achieve a degree of certainty, accuracy and reliability that has not heretofore been possible.

Briefly the step generator of the invention includes an electronic adjustable step frequency generating circuit synchronized by television vertical blanking signals. The step frequency potential charges a condenser, and the potential of this condenser, increasing in regular steps, determines the gross outline of the output voltage pattern of the device. Superimposed upon this pattern there is placed a vertical grill of 20 $\mu$s. rectangular pulses having a frequency of 15,750 C. P. S., derived from televison horizontal blanking signals. The resulting signal therefore is similar in frequency characteristics to the synchronizing pulse portions of a television video signal, and the pattern produced thereby on an oscilloscope or on a picture tube contains most of the distortions that would be produced by the same video equipment upon an actual television signal, but the geometrical shape of the pattern is such that the several types of distortion can be readily recognized and their magnitudes judged.

The pattern on a picture tube screen, when using the device of this invention, consists of a narrow vertical dark strip at the left edge of the picture to serve as a standard of blackness, and narrow horizontal strips of equal width filling the remainder of the frame, grading from white at the top through successively darker shades of gray to black at the bottom. Quantitative measurement of the brightness or tone of any strip on a picture tube can be made by use of an illuminometer. Gradation of grayness from strip to strip corresponds to voltage increments in the steps of the step generator pattern applied to the equipment under test, and gives information regarding the amplitude characteristic of the equipment. Uniformity or non-uniformity of near blackness of the strip at the left of the frame furnishes information about the low-frequency response of the equipment.

One purpose then of this invention is to provide a step generator to generate a test voltage that varies in steps to produce an oscilloscope pattern and a picture tube pattern that are easily interpreted.

Another purpose of the invention is to provide television test equipment for analyzing the distortion produced by video components.

Still another purpose of the invention is to improve the flexibility and precision of step voltage generators as a class.

A further understanding of this invention may be secured from the detailed description and the accompanying drawings, in which.

Figure 1:
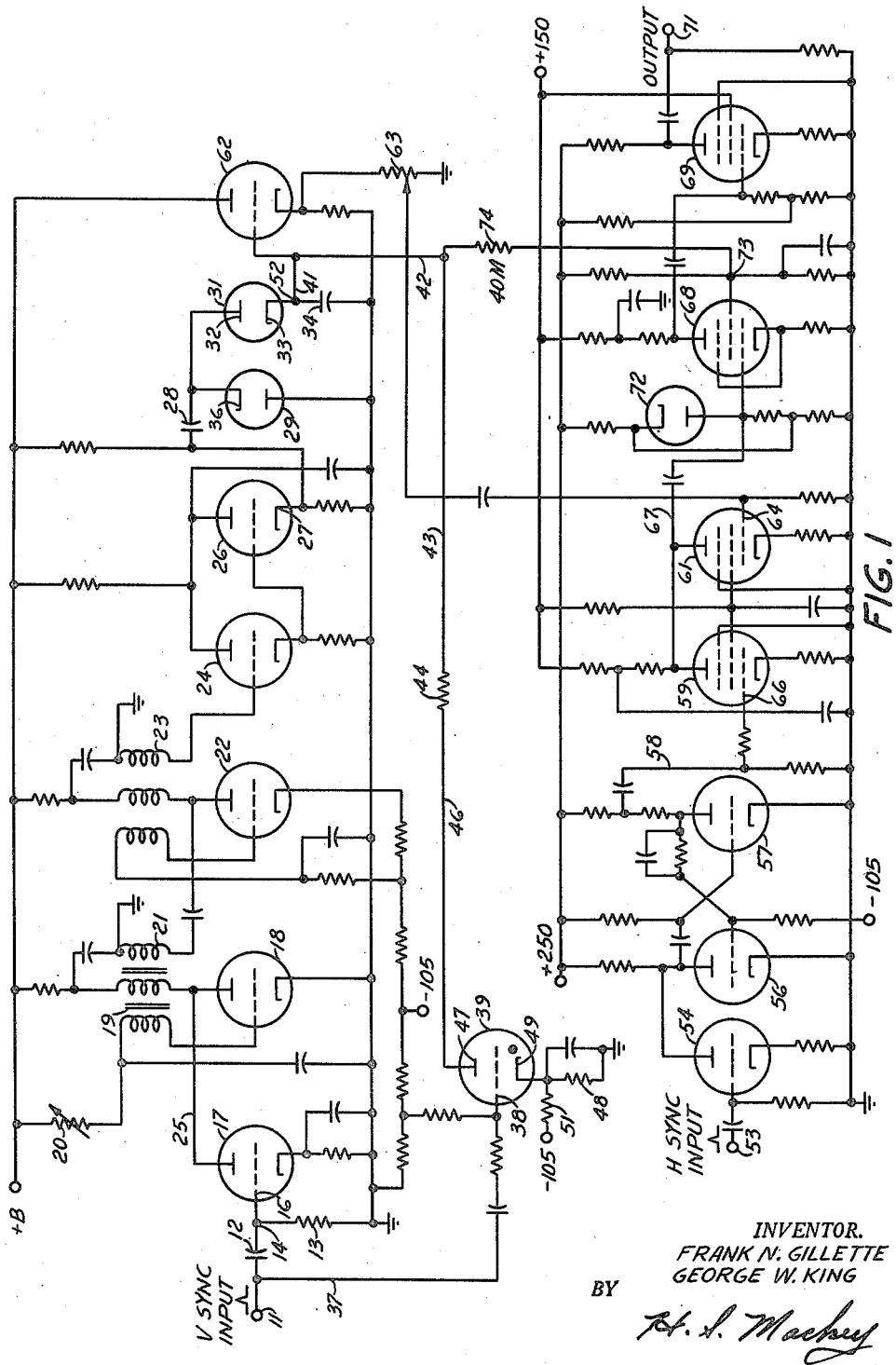
Figure 1 is a schematic diagram of an embodiment of the invention.

Referring now to Fig. 1, an input terminal 11 is provided for the reception of positive 60-cycle input pulses. These pulses can be television vertical synchronizing pulses or any other relatively short pulses occurring at this frequency. For example, short pulses may be derived from the standard 60-cycle alternating current supply in any well known manner. The input terminal 11 is connected to a differentiating circuit composed of a condenser 12 and resistor 13. This circuit is designed to sharpen the input pulses if the pulses employed are not sharp. The intermediate terminal 14 of the differentiating circuit is connected to the grid 16 of a trigger triode 17 used to introduce the sharpened input pulse to a free-running blocking oscillator tube 18. The tube 18 together with its associated pulse transformer 19 is designed to oscillate at a frequency of from 600 to 1800 cycles per second, and is adjustable through this range by means of a variable resistor 20. The purpose of introducing 60-cycle pulses through conductor 25 to the plate circuit of the blocking oscillator is to rephase it so that its oscillations are restarted with a specific phase every 1/60 second, to create a steady pattern.

It is of course obvious that an external source of periodic pulses may be employed in place of the free-running blocking oscillator, in which case the output of this external source must be coherent with the pulse voltage applied to terminal 11.

The output coil 21 of the pulse transformer 19 is connected to trigger a monostable blocking oscillator tube 22 having as its function the increasing of the regularity of the pulses and of their voltage stability, thus securing substantial independence of any variation of the pulses applied at terminal 11. As a result sharp, regular and strong pulses are applied from the pulse transformer output winding 23 to the following tubes. These tubes consist of two cathode followers 24 and 26 connected in tandem for the purpose of amplifying the pulse power and furnishing a low-impedance output terminal. These tubes also cut off the pulse output at ground potential, since they become non-conductive when their grids are carried much below ground potential. Therefore the output consists of a sharp positive pulse rising about 70 volts above ground. The output cathode 27 of the second cathode follower tube 26 is coupled through a condenser 28 to a clipping diode 29 so poled that potentials below ground are drained off, thus maintaining the quiescent or base potential of the right side of the condenser 28 at or above ground.

The clipping diode 29 is followed by a diode 31 having its anode 32 connected to the condenser 28 and its cathode 33 connected to one side of a step-generating condenser 34, the other side of the condenser 34 being grounded. The condenser 34 is chosen to be considerably larger than the condenser 28, and it is at the upper terminal of the condenser 34, connected to the cathode 33, that the pattern steps are generated. The process is as follows.

Figure 2A:
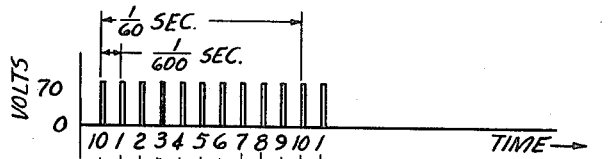
Figures 2A to 2D depict graphs illustrating the operation of the invention.

Let it be assumed that the blocking oscillator 18 is adjusted to generate signals at a frequency of 600 C. P. S. Then relatively short pulses are applied at 1/600-second intervals to the condenser 28. These pulses are positive and have a peak-to-peak potential of about 70 volts, as depicted in Fig. 2A. The condensers 28 and 34 are thereby charged to 70 volts, the voltage dividing between them in inverse proportion to their capacitances, the relative capacities being so chosen, for example that the condenser 34 is charged to one volt, while a potential difference of 69 volts exists across condenser 28. At the end of the pulse the right hand side of condenser 28 tends to go below ground potential so that current flows through the diode 29 discharging condenser 28 and maintaining the cathode 36 of diode 29 and anode 32 of diode 31 at ground potential. The condenser 34, however, is not discharged since it is isolated by the diode 31, the cathode 33 having attained a positive potential of 1 volt while the anode 32 being at ground potential becomes more negative than its associated cathode. This one volt charge retained on condenser 34 constitutes the first step of the voltage output pattern and is depicted in Fig. 2B at *a*.

Upon the occurrence of the second pulse front, 1/600 second after the first, the cathode 36 and anode 32 rise immediately with the pulse front to one volt, since up to this potential the condenser 34 is isolated by the diode 31 and the potential cannot divide between the condensers. However, when the potential rises above this point, the charge during the remainder of the rise is divided between the two condensers because when the anode 32 rises above one volt and hence becomes more positive than its associated cathode 33 and diode 31 becomes conductive. Thereafter the described process is repeated and a second step of approximately one volt more is added to the charge applied to the condenser 34 and retained by it. This second one-volt increase is indicated in Fig. 2B at *b*.

Figure 2B:
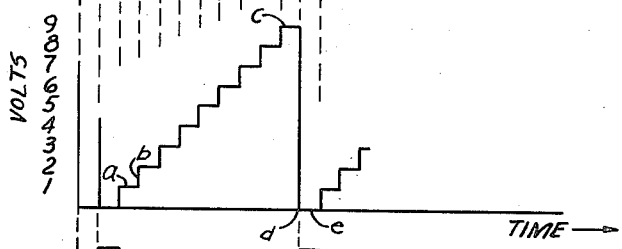

Following pulses cause additional step increases of voltage across the condenser 34 until at the end of the ninth pulse the voltage across this condenser will have been increased nine times and has a total value of approximately nine volts, as is illustrated in Fig. 2B at *c*.

At the beginning of the next or tenth input pulse, however, the condenser 34 is restored to its original condition and the step voltage is reduced to zero through the medium of a gas discharge tube 39. A connection 37 from the input terminal 11 applies input pulses to the control grid 38 of the gas discharge triode 39. Since the blocking oscillator 18 operates at 600 C. P. S. and is triggered by pulses occurring at the rate of 60 C. P. S. impressed on the input 11 the imposition of a pulse on the gas discharge tube 39 occurs coincident or approximately coincident with the time of occurrence of the tenth pulse or oscillation of the free-running blocking oscillator 18 as illustrated in Fig. 2B at the time *d*. As the result of the positive pulse being applied to its grid 38, the tube 39 becomes conductive and provides a path through which the upper terminal of the condenser 34 discharges to ground through conductors 41, 42 and 43, resistor 44, conductor 46, anode 47, cathode 49 and resistor 48. In order to compensate for resistive potential drop in the gas discharge tube and in the resistors the cathode 49 is returned to a point below ground on the divider composed of the resistors 48 and 51. The deionization time of the gas discharge tube is long enough so that the coincident pulse emitted by the blocking oscillators is not able to step up the voltage of the condenser 34, being shunted by the gas tube 39, and the condenser remains at essentially ground voltage until the next blocking oscillator pulse after the tube 39 has ceased to fire. This ground voltage step is illustrated in Fig. 2B at *e*.

The pattern of Fig. 2B as observed on a cathode ray tube is steady and does not "jiggle" because the initial point in time, *d*, of every cycle is rephased by the 60-cycle input signal at terminal 11. This same signal being employed to synchronize the vertical sweep circuit of the cathode ray tube, its application necessarily results in the horizontal stability of the elements of the pattern with relation to its frame.

The potential of the condenser terminal 52 thus goes through the cycle of step changes illustrated in Fig. 2B, repeating it every 1/60 second. In doing so the terminal 52 assumes, in ten successive periods of time, ground potential and nine higher potentials increasing by approximately equal increments. The ten periods of time are equal except that the last period may be shorter than the others, depending upon whether 1/60 second is exactly divisible by the periodicity to which the free-running blocking oscillator has been set.

The time-voltage pattern illustrated in Fig. 2B has the general outline of the output pattern of the step generator. The pattern of Fig. 2B does not, however, simulate a television signal in the important respect that it does not contain a component corresponding to the horizontal synchronizing pulses of 15,750 C. P. S. frequency. The presence of such pulses is very necessary in testing television equipment which depends on their presence to permit D. C. restoration. Consequently, in order to simulate video signals with greater fidelity, pulses at a frequency of 15,750 C. P. S. are added to the step generator pattern.

In Fig. 1 a terminal 53 is provided for the reception of a 15,750 C. P. S. positive pulse input. This input may be taken from a television transmitter either directly or through the use of a television receiver or it may be secured from a television synchronization signal generator. Ordinarily the pulses as received will have the character of the standard television horizontal blanking signal and each pulse will have a pedestal width of about 10 μs. However, in this invention it is desired to provide a near black reference strip along the left edge of the output picture pattern. In order to accomplish this, pulses at the frequency of television horizontal synchronizing pulses about 20 μs. wide are provided. This is done by causing the pulses at the input terminal 53 to trigger, through the triggering triode 54, a monostable multivibrator comprising tubes 56 and 57 having a period of 20 μs. The output at conductor 58 then consists of rectangular positive pulses 20 μs. wide at the 15,750 C. P. S. frequency, separated by spaces 43 μs. wide. These pulses are applied to a mixer comprising two pentodes 59 and 61.

Figure 2C:
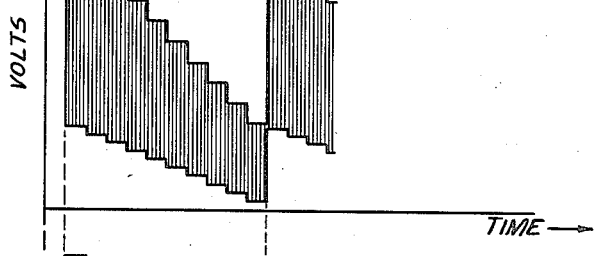

The step voltage output of the condenser 34 is also applied to the same mixer through a cathode follower tube 62 to amplify the power and reduce the circuit impedance, and through a voltage divider 63 for compensation of supply voltage variations and tube changes in the preceding part of the circuit. This step voltage output is applied to the control grid 64 of mixer tube 61, while the 20 μs. "H" pulses are applied to the control grid 66 of the other mixer tube 59. The common mixer anode circuit therefore has a potential that varies in accordance with both input patterns, with the result that the potential in the output conductor 67 has the appearance of the step pattern of Fig. 2B, inverted, with inverted "H" pulses superimposed. This is illustrated in Fig. 2C, which represents the inverted pattern of Fig. 2B with each step divided into separated segments by equal length square wave pulses. About 26 of such pulses occur in each step time interval, although the scale of the drawing prevents showing more than a few of them. As illustrated in Fig. 2C all of the "H" pulses must descend lower than the step pattern and produce some unevenness at the bottom.

Figure 2D:
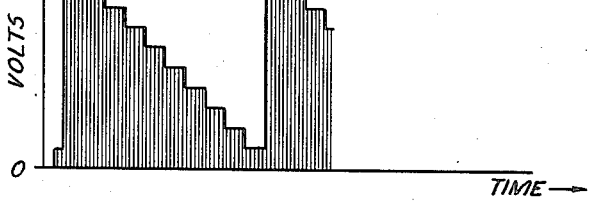

The output of the mixer is applied to a two-stage pentode amplifier comprising tubes 68 and 69, from the last anode of which the output of the step generator is available at the terminal 71. It is desirable to operate the pentodes 68 and 69 only on the straight portions of their characteristic curves, yet to utilize their power effectively. Consequently, a diode clipper tube 72 is added to set an upper limit to the pattern output voltage and the negative grid cutoff point of pentode 68 sets a lower limit. The phase at the output terminal 71 is the same as the phase at the amplifier input conductor 67, consequently the output at terminal 71 has an appearance similar to that of Fig. 2C except that the bottom of the pattern is clipped. This clipped pattern is illustrated in Fig. 2D. In operation the control voltage divider 63 is adjusted so that the top step is not abbreviated and so that the bottom of the pattern is clipped as desired.

In operation of the step generator as so far described it was observed that horizontal lines of the output step pattern 2B had a tendency to descend toward the right, caused by leakage of charge from condenser 34, Fig. 1, during the period of each step. Although such leakage can be minimized by using high quality parts it cannot be entirely eliminated. The present invention, however, contemplates an auxiliary circuit arrangement for compensating for this leakage so that a perfect pattern is produced resulting in more accurate diagnosis and correction of circuit faults. Such compensatory circuit consists in connecting the high voltage side of condenser 34 to a suitable direct current potential through a high resistance. In the present embodiment the terminal 52 of the condenser 34 is connected through a resistance 74 of 40 megohms to the terminal 73 of the screen grid supply of the pentode 68. As the result, the leakage from the condenser 34 during its generation of the steps of the pattern is neutralized by an opposite current leakage through the resistor 74 and any deviation of an individual step is made negligible or non-existent.

Figure 3:
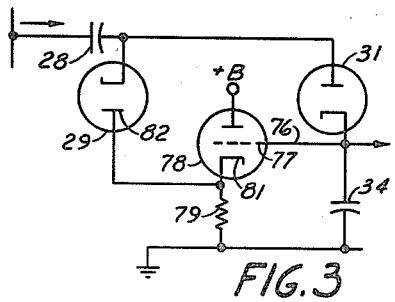
Figure 3 is a schematic diagram of a modified portion of the circuit of Fig. 1.

Fig. 3 embodies a modification of this invention. In describing the successive increases of voltage across the condenser 34 depicted in Fig. 2B, it was stated that the second voltage rise was approximately equal to the first. As a matter of fact, if the first voltage rise were one volt the second rise would be only $69/70$ volt and the third $68/70$ volt. The entire set of steps would decrease in this manner, each step being slightly less than the preceding one. While the difference in height of the steps is small in such an arrangement even this slight discrepancy may be eliminated by the circuit of Fig. 3, which produces voltage steps that are exactly equal. It operates in the following manner.

When the condenser 34 has been charged to +1 volt, that potential is applied through conductor 76 to the control grid 77 of a cathode follower tube 78. This tube is thereby made to conduct more current, resulting in more potential drop in the cathode resistor 79, so that the cathode 81 is raised by one volt in potential. The cathode 81 is connected to the anode 82 of the diode 29, and raises it also by one volt above ground. Therefore, when the input pulse of 70 volts is removed from the left or input side of the condenser 28, the right side of that condenser does not fall to ground potential under control of the diode 29, as in the previous description, but falls only to the +1 volt level of the anode 82. Consequently, upon application of the next pulse to the input side of the condenser 28, the voltage of the pulse immediately begins to be shared by the two condensers 28 and 34, because there is no longer a one-volt differential across the diode 31, but both electrodes thereof are at exactly the same potential. As the result, the full 70 volts is applied to increasing the charge of the condenser 34 and each voltage step of the resulting step pattern is exactly of the same magnitude as every other step. The pattern of Fig. 2B is therefore completely uniform consisting of equal horizontal time elements and equal vertical voltage elements. When such a circuit is utilized it will be appreciated that the condensers 28 and 34 need not necessarily be of different sizes.

Figure 4:
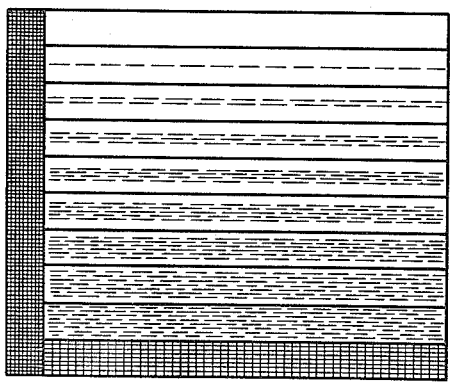
Figure 4 is a representation of a test pattern produced by the equipment of the invention upon a picture tube screen.

The pattern voltage available at the terminal 71, Fig. 1, is intended to be applied to the input of a video amplifier or other equipment to be tested, and in the absence of any distortion in the video amplifier, when an oscilloscope is applied to its output terminals, the observed oscilloscope pattern will be that depicted in Fig. 2D. If, however, it is desired to ascertain the quality of an amplifier or other equipment under test by observing a picture tube pattern, the video amplifier output is made to actuate a television picture tube in the usual manner. It is obvious then that the appearance will be depicted in Fig. 4. The first 20 μs. portion of each horizontal scan is a selected very dark gray level, represented by the level of zero voltage in Fig. 2D, but on the picture tube the first 9 or 10 μs. of this period is invisible because the cathode ray beam of the picture tube is being returned during this period across the screen of the tube. During the remaining 10 or 11 μs. of the 20 μs. interval, however, the beam has begun its proper horizontal scan and since the beam is still blanked, a nearly black strip appears at the left edge of the picture frame composed of this portion of each horizontal scan line. The density of this strip serves as a black standard with which other portions of the picture can be compared. During one vertical scan period of time the voltage intensity applied by the step generator varies in steps from high to low, corresponding to variation from white level to black level. Since the picture tube scans vertically from top to bottom, the entire frame except in the black strip at the left edge will be filled with equal horizontal strips varying from white at the top through all shades of gray to black at the bottom. Adjustment is preferably made to result in a pattern like that of Fig. 4, so that the blackness of the bottom strip is one step less black than the blackness of the left edge strip. This bottom strip represents the blackest portions of a television picture, which normally are slightly less black than the blanking black level.

What is claimed is:

1. A test pattern generator comprising, a source of signals having a frequency substantially equal to the frequency of television vertical synchronizing signals, an oscillator having a signal pulse output whose frequency of repetition is a substantial multiple of the frequency of the signals of said source, circuit means for impressing said source of signals on the input of said oscillator periodically to rephase the signal pulse output thereof, a pair of capacitors one of which is considerably larger than the other connected in series through a diode the anode of which is connected to the smaller and the cathode of which is connected to the larger of the capacitors, a discharge tube having at least an anode, cathode and control electrode having its control electrode connected to the cathode of said diode and its cathode connected to a terminal of reference potential through a resistor, a second diode having its cathode connected to the anode of said first mentioned diode and its anode connected to the cathode of said discharge tube, circuit means for applying a voltage across said pair of capacitors in timed relation to the occurrence of said pulse signals, means for discharging said larger capacitor in timed relation to the signal whose frequency is substantially that of television vertical synchronizing signals whereby the potential across said larger capacitor is increased in successive steps in recurrent cyclic intervals, a second source of pulse signals whose frequency of repetition is substantially that of television horizontal synchronizing signers, and means for modulating the varying potential existing across said larger capacitor by said last mentioned pulse signals to produce a varying potential corresponding to a desired test pattern.

2. A test pattern generator comprising, a source of signals having a frequency substantially equal to the frequency of television vertical synchronizing signals, an oscillator having a signal pulse output whose frequency of repetition is a multiple of the frequency of the signals of said source, first and second capacitors connected in series through a first diode, the anode of which is connected to the first and cathode of which is connected to the second of said capacitors, a discharge tube having at least an anode, cathode and control electrode, having its control electrode connected to the cathode of said first diode and its cathode connected to a terminal of reference potential through a resistor, a second diode having its cathode connected to the anode of said first diode and its anode connected to the cathode of said discharge tube, circuit means for applying a voltage across said capacitors in timed relation to the occurrence of said pulse signals, means for discharging said second capacitor in timed relation to the signal whose frequency is substantially equal to that of vertical synchronizing signals whereby the potential across said second capacitor is increased in successive steps in recurrent cyclic intervals, a second source of pulse signals whose frequency of repetition is substantially equal to the frequency of television horizontal synchronizing signals, and means for modulating the varying potential existing across said second capacitor by said last mentioned pulse signals to produce a varying potential corresponding to a desired test pattern.

3. A test pattern generator comprising, a source of signals having a frequency substantially equal to the frequency of television vertical synchronizing signals, an oscillator having a signal pulse output whose frequency of repetition is a multiple of the frequency of the signals of said source, a capacitor, circuit means for applying said signal pulse output to said capactior to add successive increments of charge thereto in timed relation to the occurrence of said pulse signals, circuit means interconnecting said capacitor and said source of signals whose frequency is substantially equal to vertical synchronizing signals for discharging said capacitor in timed relation to the signals of said source, means for generating pulse signals whose frequency of repetition is substantially equal to the frequency of television horizontal synchronizing signals but whose length of duration exceeds the length of duration of horizontal synchronizing signals, and means for modulating the potential existing across said capacitor by said last mentioned pulse signals to produce a varying potential corresponding to a desired test pattern.

4. A test pattern generator as set forth in claim 3 in which said capacitor is connected to a terminal of positive potential through a resistor of high value to compensate for leakage of charge of said capacitor.

5. A test pattern comprising, a source of signals having a frequency substantially equal to the frequency of television vertical synchronizing signals, an oscillator having a signal pulse output whose frequency of repetition is a multiple of the frequency of the signals of said source, a pair of capacitors one of which is considerably larger than the other connected in series through a first diode, the anode of which is connected to the smaller and the cathode of which is connected to the larger of said capacitors, a second diode having its cathode connected to the anode of said first diode and its anode connected to the terminal of said larger capacitor remote from said first diode, circuit means for applying a voltage across said pair of capacitors in timed relation to the occurrence of said pulse signals, means for discharging said larger capacitor in timed relation to the signal whose frequency is substantially that of television vertical synchronizing signals, means for generating pulse signals whose frequency of repetition is substantially equal to the frequency of television horizontal synchronizing signals but whose length of duration exceeds the length of duration of horizontal synchronizing signals, and means for modulating the potential existing across said larger capacitor by said last mentioned pulse signals to produce a varying potential corresponding to a desired test pattern.

6. A test pattern generator as set forth in claim 5 in which the terminal of said larger capacitor which is connected to said first diode is also connected to a terminal of positive potential through a high value resistor to neutralize leakage of charge of said capacitor.

7. A test pattern generator comprising, a source of signals having a frequency substantially equal to the frequency of television vertical synchronizing signals, an oscillator having a signal pulse output whose frequency of repetition is a multiple of the frequency of the signals of said source, first and second capacitors connected in series through a first diode, the anode of which is connected to the first and the cathode of which is connected to the second of said capacitors, a second diode having its cathode connected to the anode of said first diode and its anode connected to a terminal of reference potential, means interconnecting said second capacitor and said second diode for maintaining the anode potential of said second diode at the potential existing across said second capacitor, circuit means for applying a voltage across said capacitors in timed relation to the occurrence of said pulse signals, means for discharging said second capacitor in timed relation to the signal whose frequency is substantially equal to that of vertical synchronizing signals, means for generating pulse signals whose frequency of repetition is substantialy equal to the frequency of television horizontal synchronizing signals but whose length of duration exceeds the length of duration of such horizontal synchronizing signals, and means for modulating the potential existing across said second condenser by said last mentioned pulse signals to produce a varying potential corresponding to a desired test pattern.

8. A test pattern generator as set forth in claim 7 in which the terminal of said second condenser which is connected to said first diode is also connected to a terminal of positive potential through a high value resistor to neutralize leakage of charge of said capacitor.

9. A test pattern generator comprising, a source of signals having a frequency substantially equal to the frequency of television vertical synchronizing signals, an oscillator having a signal pulse output whose frequency of repetition is a multiple of the frequency of the signals of said source, first and second capacitors connected in series through a first diode, the anode of which is connected to the first and the cathode of which is connected to the second of said capacitors, a discharge tube having at least an anode, cathode and control electrode, having its control electrode connected to the cathode of said first diode and its cathode connected to a terminal of reference potential through a resistor, a second diode having its cathode connected to the anode of said first diode and its anode connected to the cathode of said discharge tube, circuit means for applying a voltage across said capacitors in timed relation to the occurrence of said pulse signals, means for discharging said second capacitor in timed relation to the signal whose frequency is substantially equal to that of vertical synchronizing signals, means for generating pulse signals whose frequency of repetition is substantially equal to the frequency of television horizontal synchronizing signals but whose length of duration exceeds the length of duration of such horizontal synchronizing signals, and means for modulating the potential existing across said second condenser by said last mentioned pulse signals to produce a varying potential corresponding to a desired test pattern.

10. A test pattern generator as set forth in claim 9 in which the terminal of said second condenser which is connected to said first diode is also connected to a terminal of positive potential through a high value resistor to neutralize leakage of charge of said capacitor.

11. A test pattern generator comprising, a source of signals having a frequency substantially equal to the frequency of television vertical synchronizing signals, an oscillator having a signal pulse output whose frequency of repetition is a substantial multiple of the frequency of the signals of said source, circuit means for impressing said source of signals on the input of said oscillator periodically to rephase the signal pulse output thereof, a pair of capacitors one of which is considerably larger than the other connected in series through a first diode, the anode of which is connected to the smaller and the cathode of which is connected to the larger of said capacitors, a second diode having its cathode connected to the anode of said first diode and its anode connected to the terminal of said larger capacitor remote from said first diode, circuit means for applying a voltage across said pair of capacitors in timed relation to the occurrence of said pulse signals, means for discharging said larger capacitor in timed relation to the signal whose frequency is substantially that of television vertical synchronizing signals, means for generating pulse signals whose frequency of repetition is substantially equal to the frequency of television horizontal synchronizing signals but whose length of duration exceeds the length of duration of horizontal synchronizing signals, and means for modulating the potential existing across said larger capacitor by said last mentioned pulse signals to produce a varying potential corresponding to a desired test pattern.

12. A test pattern generator comprising, a source of signals having a frequency substantially equal to the frequency of television vertical synchronizing signals, an oscillator having a signal pulse output whose frequency of repetition is a substantial multiple of the frequency of the signals of said source, circuit means for impressing said source of signals on the input of said oscillator periodically to rephase the signal pulse output thereof, first and second capacitors connected in series through a first diode, the anode of which is connected to the first and the cathode of which is connected to the second of said capacitors, a second diode having its cathode connected to the anode of said first diode and its anode connected to a terminal of reference potential, means interconnecting said second capacitor and said second diode for maintaining the anode potential of said second diode at the potential existing across said second capacitor, circuit means for applying a voltage across said capacitors in timed relation to the occurrence of said pulse signals, means for discharging said second capacitor in timed relation to the signal whose frequency is substantially equal to that of vertical synchronizing signals, means for generating pulse signals whose frequency of repetition is substantially equal to the frequency of television horizontal synchronizing signals but whose length of duration exceeds the length of duration of such horizontal synchronizing signals, and means for modulating the potential existing across said second condenser by said last mentioned pulse signals to produce a varying potential corresponding to a desired test pattern.

13. A test pattern generator comprising, a source of signals having a frequency substantially equal to the frequency of television vertical synchronizing signals, an oscillator having a signal pulse output whose frequency of repetition is a substantial multiple of the frequency of the signals of said source, circuit means for impressing said source of signals on the input of said oscillator periodically to rephase the signal pulse output thereof, first and second capacitors connected in series through a first diode, the anode of which is connected to the first and the cathode of which is connected to the second of said capacitors, a discharge tube having at least an anode, cathode and control electrode, having its control electrode connected to the cathode of said first diode and its cathode connected to a terminal of reference potential through a resistor, a second diode having its cathode connected to the anode of said first diode and its anode connected to the cathode of said discharge tube, circuit means for applying a voltage across said capacitors in timed relation to the occurrence of said pulse signals, means for discharging said second capacitor in timed relation to the signal whose frequency is substantially equal to that of vertical synchronizing signals, means for generating pulse signals whose frequency of repetition is substantially equal to the frequency of television horizontal synchronizing signals but whose length of duration exceeds the length of duration of such horizontal synchronizing signals, and means for modulating the potential existing across said second condenser by said last mentioned pulse signals to produce a varying potential corresponding to a desired test pattern.

References Cited in the file of this patent

UNITED STATES PATENTS

| | | |
|---|---|---|
| 2,207,389 | Wendt | July 9, 1940 |
| 2,207,499 | Vance | July 9, 1940 |
| 2,413,440 | Farrington | Dec. 31, 1940 |
| 2,444,036 | Crost | June 29, 1948 |
| 2,445,361 | Mountjoy et al. | July 20, 1948 |
| 2,469,066 | Day | May 3, 1949 |
| 2,529,547 | Fisher | Nov. 14, 1950 |
| 2,566,056 | Delvaux | Aug. 28, 1951 |
| 2,620,456 | White | Dec. 2, 1952 |
| 2,660,676 | Doba, Jr. et al. | Nov. 24, 1953 |